United States Patent [19]
Botkins

[11] Patent Number: 5,265,369
[45] Date of Patent: Nov. 30, 1993

[54] FLOATING JUG FISHING DEVICE

[76] Inventor: L. T. Botkins, 2910 Oak Dr., Paragould, Ark. 72450

[21] Appl. No.: 52,457

[22] Filed: Apr. 26, 1993

[51] Int. Cl.$^5$ ............................................. A01K 93/00
[52] U.S. Cl. ........................................ 43/43.11; 43/4; 242/96; 441/26; 215/228
[58] Field of Search ............... 43/4, 43.11, 43.9, 43.1, 43/44.87; 242/96, 85.1; 441/6, 26; 215/228, 329

[56] References Cited

U.S. PATENT DOCUMENTS

| | | | |
|---|---|---|---|
| 739,324 | 9/1903 | Koening | 43/43.1 |
| 779,937 | 1/1905 | Holt | 43/43.11 |
| 1,804,084 | 5/1931 | Blake | 43/43.1 |
| 3,179,351 | 4/1965 | Ehlert | 242/96 |
| 3,216,146 | 11/1965 | Johnson et al. | 43/43.11 |
| 3,667,417 | 6/1972 | Clinkenbeard | |
| 4,443,203 | 4/1984 | Maertens | 441/26 |
| 4,607,449 | 8/1986 | Brachear | 43/43.11 |
| 4,831,762 | 5/1989 | Harris | 43/17 |
| 4,858,369 | 8/1989 | Collins | 43/43.11 |
| 5,083,953 | 1/1992 | Richardson | 441/6 |
| 5,188,551 | 2/1993 | Keller | 441/6 |
| 5,207,013 | 5/1993 | Bartok et al. | 43/4 |

Primary Examiner—Paula A. Bradley
Assistant Examiner—Jeanne M. Elpel
Attorney, Agent, or Firm—Norman B. Rainer

[57] ABSTRACT

A device for use in a jug fishing apparatus has a closure lid portion adapted to be securable onto a male threaded lip of a conventional wide-mouth plastic jar. A spool portion forwardly emergent from the closure lid portion and having axial and radial bores accommodates a length of spirally wound fishing line which passes through the bores. A circular flange forwardly emergent from the spool portion and penetrated by the line has a rearwardly facing convex surface and forwardly facing concave surface.

5 Claims, 1 Drawing Sheet

FLOATING JUG FISHING DEVICE

BACKGROUND OF THE INVENTION

1. Field of the Invention

This invention relates to baited hook and line fishing, and more particularly concerns a fishing technique known as jug fishing.

2. Discussion of the Prior Art

Jug fishing is a very effective way of catching fish, especially catfish. This fishing technique typically involves tying a line with a baited, weighted hook onto the handle of an empty plastic jug of the kind used for packaging milk, laundry bleach, and other common commodities of commerce. The jug and line are set adrift in farm ponds, coves, creeks, on lakes, in inlets and on backwaters of rivers and streams. Rapid bobbing or running of the jug indicates that a fish is hooked. The fisherman rows or motors his boat to the jug, retrieves the fish, rebaits the hook, and returns the jug to the water. Very little or no experience is required in such manner of fishing.

Many states allow up to 50 jugs per license holder. Handling such a large number of jugs in a boat requires great care to avoid tangling of the lines, both when launching them, and when retrieving them after fishing is concluded. It is time-consuming and inefficient to bait individual hooks as the jugs are placed in the water while simultaneously handling the oars and occasionally separating tangled lines. At best, jug fishing has been a makeshift affair using floatation jugs not specifically designed for the purpose and being awkward for one or even two persons to handle in large numbers from a small boat.

U.S. Pat. No. 4,607,449 to Brachear discloses a fishing jug comprising a hollow housing having a cylindrical sidewall and a bottom end configured to function as a spool for the retention of a wound fishing line. Although the Brachear jug is well designed for its intended purpose, its manufacture is so expensive as to deny it commercial success.

In using fishing jugs, it is often desirable to modify the jug in a manner such that an audible signal is produced when a fish is hooked. The most common expedient for producing an adequate noise is to place a marble within the jug. The rattling of the marble against the interior walls of the plastic jug produces sufficient noise to attract the attention of the fisherman. However the use of a marble is ineffective when narrow mouth jugs are employed because the marble tends to become restrained within the narrow neck of the jug. In the case of wide-mouth jars, if the jar is in a tilted position while floating above the hook, the marble will become restrained in the downward corner of the closure lid.

It is accordingly an object of the present invention to provide a device for use as a component of a fishing jug and which will provide for the retention of a wound fishing line.

It is a further object of this invention to provide a device as in the foregoing object which will permit good functionality of a noise-generating marble.

It is another object of the present invention to provide a device of the aforesaid nature which permits utilization of a commonly available plastic jar to produce an inexpensive fishing jug.

These and other beneficial objects and advantages will be apparent from the following description.

SUMMARY OF THE INVENTION

The improvements, objects and advantages of the invention are accomplished by a device comprising:

a) a closure lid portion comprised of a sidewall having forward and rearward extremities and further defined by circular cylindrical interior and exterior surfaces disposed about a common center axis, said interior surface being threaded so as to be securable onto a male threaded lip of a standard wide-mouth plastic jar, and a closure panel associated with said forward extremity and filling the region bounded by said sidewall, said panel defined by flat interior and exterior surfaces, b) a spool portion of circular cross-sectional configuration emergent from the flat exterior surface of said closure lid and centered thereupon, said spool portion extending to a forward extremity and having communicating axial and radial bores, and c) a circular flange emergent from the forward extremity of said spool portion and bounded by a rearwardly facing convex surface and a forwardly facing concave surface upon which said axial bore opens.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
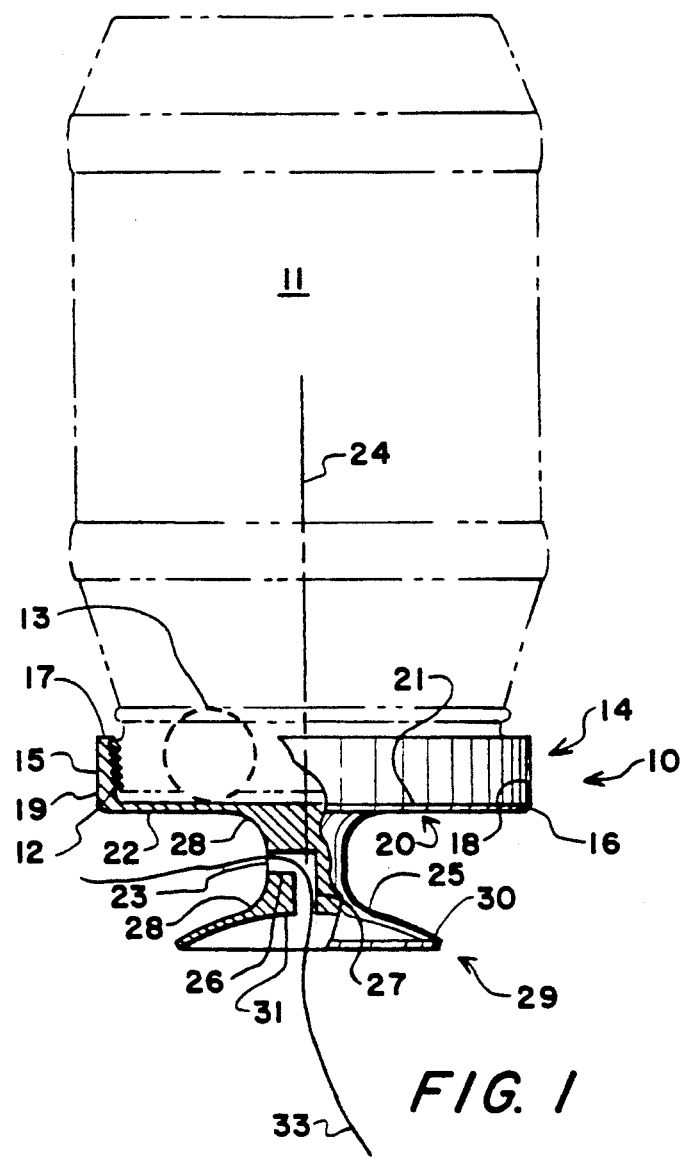
FIG. 1 is a vertical sectional view of an embodiment of the device of the present invention shown in functional association with a wide-mouth plastic jar of conventional design.
Figure 2:
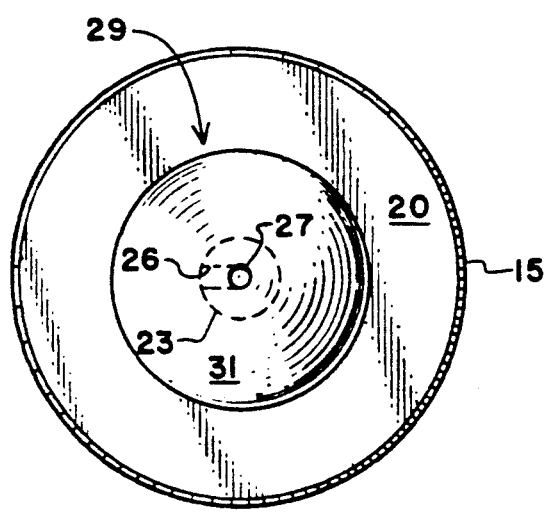
FIG. 2 is a front view of the embodiment of FIG. 1.

Referring to FIGS. 1 and 2, an embodiment of the device 10 of the present invention is shown in operational engagement with a wide mouth plastic canning jar 11 of conventional design having a male threaded lip 12 bordering the mouth opening. A marble 13 is shown sealed within the jar by the device 10. The combination of the device 10, the jar 11 and marble represents a fishing jug.

One extremity of the device 10 is configured as a closure lid portion 14 comprised of sidewall 15 having forward and rearward extremities 16 and 17, respectively, and further defined by circular cylindrical interior and exterior surfaces 18 and 19, respectively, disposed about a common center axis 24. Interior surface 18 is threaded so as to be securable onto the male threaded lip 12 of said jar. A closure panel 20 associated with forward extremity 16 fills the region bounded by said sidewall. Panel 20 is further characterized in having flat interior and exterior surfaces 21 and 22, respectively.

A spool portion 23 of circular cross-sectional configuration is emergent from flat exterior surface 22 in centered disposition upon axis 24 and extends to a forward extremity 25. Said spool portion may alternatively be described as a surface of revolution about axis 24. A radial bore 26 penetrates said spool portion. An axial bore 27 is centered upon axis 24, and communicates with radial bore 26. Said spool portion may be of circular cylindrical contour, or may be enlarged from cylindrical contour in arcuate zones 28 adjacent flat exterior surface 22 and forward extremity 25.

A circular flange 29 emergent from forward extremity 25 of said spool portion is bounded by a rearwardly facing convex surface 30, and a forwardly facing concave surface 31. Axial bore 27 opens upon said concave surface.

The overall shape of the device is such that axis 24 is substantially a line of symmetry. The entire device is preferably of monolithic construction, as may be fabricated by plastic material in a molding operation.

In operation, a wound length of fishing line 33 is held by spool portion 23. The line is threaded so as to pass through said radial and axial bores and thence downwardly from concave surface 31. By virtue of such manner of deployment of the line, the jar is caused to float in a vertically upright disposition. The upright disposition, in conjunction with the relatively large area provided by closure panel 20, causes the marble 13 to have considerable freedom of movement with attendant efficient noise-generating capability.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A fishing device comprising:

a) a closure lid portion comprised of a sidewall having forward and rearward extremities and further defined by circular cylindrical interior and exterior surfaces disposed about a common center axis, said interior surface being threaded so as to be securable onto a male threaded lip of a conventional wide-mouth plastic jar, and a closure panel associated with said forward extremity and filling the region bounded by said sidewall, said panel defined by flat interior and exterior surfaces,
    b) a spool portion of circular cross-sectional configuration emergent from the flat exterior surface of said closure lid and centered thereupon, said spool portion extending to a forward extremity and having communicating axial and radial bores, and
    c) a circular flange emergent from the forward extremity of said spool portion and bounded by a rearwardly facing convex surface and a forwardly facing concave surface upon which said axial bore opens.

2. The fishing device of claim 1 being of monolithic structure fabricated of plastic material by a molding operation.

3. The fishing device of claim 1 including a standard wide-mouth plastic jar sealed to said closure lid portion.

4. The fishing device of claim 3 further containing a spherical marble enclosed within said jar.

5. The fishing device of claim 4 further containing a length of fishing line threaded to pass through said radial and axial bores and thence forwardly from said concave surface.

* * * * *